(No Model.)

J. J. JOHNSTON.
MACHINE FOR SOLDERING TIN CANS.

No. 276,823. Patented May 1, 1883.

Witnesses

Inventor
John J. Johnston,
By Atty. J. M. Kalb

UNITED STATES PATENT OFFICE.

JOHN J. JOHNSTON, OF SAN FRANCISCO, CALIFORNIA.

MACHINE FOR SOLDERING TIN CANS.

SPECIFICATION forming part of Letters Patent No. 276,823, dated May 1, 1883.

Application filed February 9, 1882. (No model.)

*To all whom it may concern:*

Be it known that I, JOHN J. JOHNSTON, of the city and county of San Francisco, State of California, have invented an Improved Machine for Soldering Tin Cans; and I do hereby declare that the following is a full, clear, and exact description thereof.

In the manufacture of tin cans the body of the can is first formed and the overlapping edges which form the longitudinal seam are united by solder before the bottom or ends are applied. Before soldering this longitudinal seam, the body consists merely of a cylindrical coil of tin the edges of which slightly overlap each other. In order to solder the seam, the body or coil is slipped on a cylindrical form and the edges properly overlapped, after which a clamp is applied to hold the two edges in position while the workman solders the seam.

My apparatus is of the class which has a revolving table upon which the cylindrical forms are placed, and the invention will be understood, as hereinafter set forth and claimed.

Figure 1:
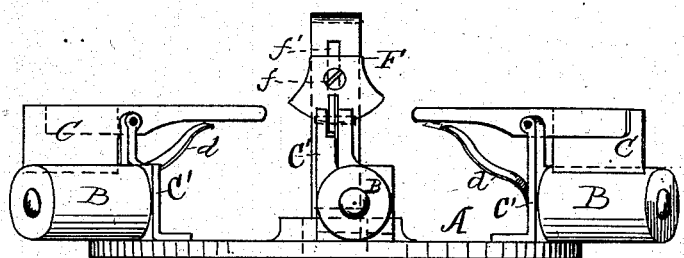
Figure 3:
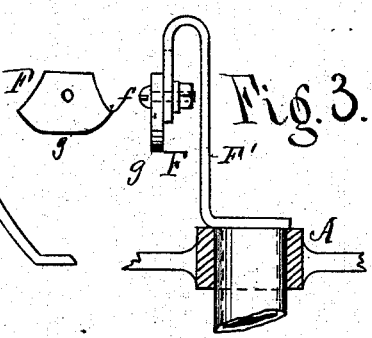
Figure 2:
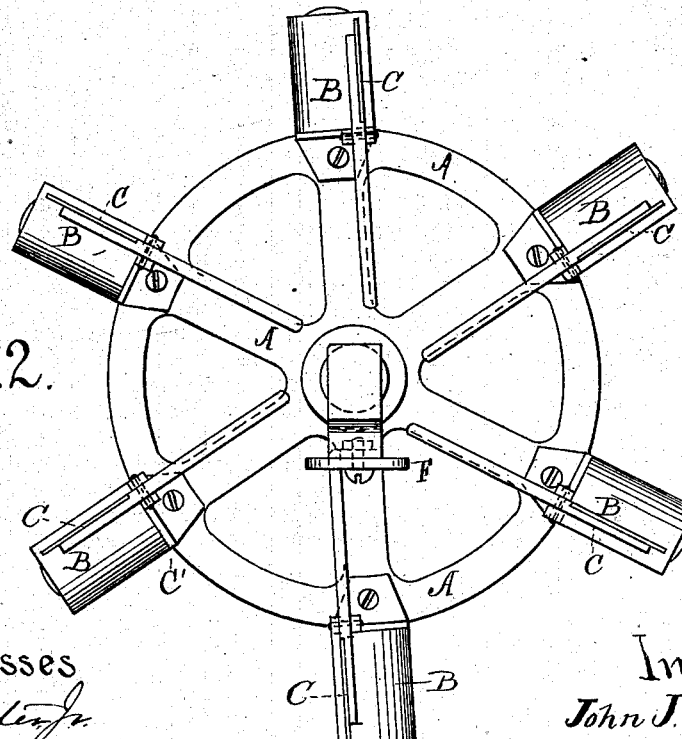

Referring to the accompanying drawings, Figure 1 is an elevation, and Fig. 2 a plan, of the machine. Fig. 3 is a detail of the lifting device.

A is a turn-table, which can be mounted on any convenient support. On this turn-table I secure as many cylindrical forms B as desired, placing them at equal distances apart. These forms are of the kind usually employed for holding the can-bodies while they are being soldered. Each form is provided with a clamp, C, of the usual kind, and with a spring, $d$, to force the clamp down upon the form. The clamp C is pivoted in an upright standard, C', and extends back toward the center of the table in a lever, by means of which, in connection with certain depressing means to be fully described, the clamp is raised from the can. Beneath the lever a strap-spring, $d$, is secured to the upright C' and exerts its force to throw and retain the clamp in place upon the can, but is sufficiently easy as to be depressed with the lever.

In using this machine a boy stands on the side opposite the workman and removes the soldered bodies as fast as they are brought to him by the rotation of the table, and then places the unsoldered bodies in their place. He also adjusts the overlapping edges and applies the clamp to hold them in place, and then rotates the table so as to bring another form in front of him. While he is doing this the workman has nothing to do but solder the seams as fast as they come in front of him.

In order to facilitate the work, I employ an automatic device, F, for lifting the clamps as they come successively in front of the boy or helper. The one here represented is a plate, the lower edge of which is circular or convex, so that the inner ends of the clamps will be depressed as they pass under it, so that the opposite or clamp end is raised. In the middle of the curve or arc I make a flat place, $g$, where the levers will stop when fully depressed, and which serves as a guide or indicator to tell when the form is in place. The depressor F is mounted adjustably on a standard, F', the adjustment being made by providing a slot, $f'$, in the standard, and a set-screw, $f$, with proper securing means, whereby the depressor F may be raised or lowered.

Having thus described my invention, what I claim, and desire to secure by Letters Patent, is—

The combination of the revolving table A, forms B, spring-clamps C $d$, having an inwardly-extending lever, with the stationary standard F', provided with the slot $f'$, depressor F, and screw $f$, whereby the depressor can be set to reach the lever at any height, as set forth.

JOHN J. JOHNSTON.

In presence of—
B. SCHLESINGER,
J. D. GAGNON.